United States Patent
Mariani et al.

(10) Patent No.: US 10,252,586 B2
(45) Date of Patent: Apr. 9, 2019

(54) TYRE MOUNTING/DEMOUNTING TOOL

(71) Applicant: Snap-on Equipment Srl a unico socio, Correggio (RE) (IT)

(72) Inventors: Massimo Mariani, Mantova (IT); Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 0 days.

(21) Appl. No.: 14/938,713

(22) Filed: Nov. 11, 2015

(65) Prior Publication Data

US 2016/0129739 A1 May 12, 2016

(30) Foreign Application Priority Data

Nov. 11, 2014 (DE) .................... 20 2014 008 932 U

(51) Int. Cl.
| | |
|---|---|
| *B60C 25/05* | (2006.01) |
| *B60C 25/135* | (2006.01) |
| *B60C 25/138* | (2006.01) |
| *B60C 25/04* | (2006.01) |

(52) U.S. Cl.
CPC ........ B60C 25/0593 (2013.01); B60C 25/135 (2013.01); B60C 25/138 (2013.01); *B60C 25/04* (2013.01); *B60C 25/05* (2013.01)

(58) Field of Classification Search
CPC .... B60C 25/0593; B60C 25/135; B60C 25/05
USPC .................................................. 157/1.1–1.3
See application file for complete search history.

(56) References Cited

U.S. PATENT DOCUMENTS

| | | | | |
|---|---|---|---|---|
| 355,754 | A * | 1/1887 | Beck ...................... | A47G 21/06 7/109 |
| 2,112,661 | A * | 3/1938 | Abrahams ............... | B60C 25/02 157/1.1 |
| 2,399,146 | A * | 4/1946 | Schumann .............. | B60C 25/02 157/1.3 |
| 6,408,921 | B1 * | 6/2002 | Bonacini ............... | B60C 25/132 157/1.24 |
| 6,823,922 | B2 * | 11/2004 | Gonzaga ................. | B60C 25/13 157/1.17 |
| 7,128,119 | B2 * | 10/2006 | Corghi ................ | B60C 25/0578 157/1.22 |
| 7,261,135 | B2 * | 8/2007 | Abinal .................. | B60C 25/135 157/1 |
| 7,621,311 | B2 * | 11/2009 | Lawson ................ | B60C 25/138 157/1 |
| 7,743,812 | B2 * | 6/2010 | Sotgiu ................. | B60C 25/0578 157/1.24 |

(Continued)

*Primary Examiner* — Monica Carter
*Assistant Examiner* — Danny Hong
(74) *Attorney, Agent, or Firm* — McDermott Will & Emery LLP

(57) ABSTRACT

A mounting/demounting tool for mounting/demounting a tire with respect to the rim of a vehicle wheel, comprising a tool body defining a first end of the tool, an extension from the tool body defining a second end of the tool, and a hook arranged at the extension in the vicinity of the second end. The hook has an inner surface section for gripping and guiding a tire bead during tire demounting, and a first outer surface section for guiding a tire bead during tire mounting. A protrusion extends from between the first outer surface section and a second outer surface section of the hook to the second end.

13 Claims, 4 Drawing Sheets

(56) References Cited

U.S. PATENT DOCUMENTS

| | | | | |
|---|---|---|---|---|
| 8,544,520 B2* | 10/2013 | Sotgiu | ............ | B60C 25/056 157/1.17 |
| 2004/0221964 A1* | 11/2004 | Bonacini | ............ | B60C 25/138 157/1.28 |
| 2006/0254725 A1* | 11/2006 | Gonzaga | ............ | B60C 25/0578 157/1.17 |
| 2010/0051205 A1* | 3/2010 | Ochoa | ............ | B60C 25/04 157/1.3 |

* cited by examiner

TYRE MOUNTING/DEMOUNTING TOOL

This application claims the benefit of priority to German Patent Application No. 202014008932.9, filed on Nov. 11, 2014 with the German Intellectual Property Office, the disclosure of which is incorporated in its entirety by reference herein.

The present invention relates to a mounting/demounting tool unit for mounting a tyre to or demounting a tyre from a rim of a vehicle wheel and for being adapted to be attached to a tyre mounting/demounting machine, as well as to a tyre mounting/demounting machine itself.

In practice, tyre mounting/demounting machines are known for mounting a tyre to or demounting a tyre from a rim of a vehicle wheel which comprise a wheel support having a shaft and clamping means for rotatably and reversibly holding a rim of a wheel from which a tyre is to be demounted or to which a tyre is to be mounted during the mounting/demounting procedure. Mounting and demounting tools being provided on tool carrier arms, are supported at a tool support post along which the tool carrier arms can be moved. The tools can include bead breakers for loosening the tyre bead from the rim edge. Moreover, the tools can also comprise a removal tool for gripping and moving the tyre bead of the tyre to be demounted out of the rim.

EP patent 1 398 184 discloses a tyre demounting tool that is pivotally attached to a tool carrier arm. The demounting tool has a hook element arranged at its front end for engaging the tyre bead of a tyre to be demounted from the wheel rim. Two piston/cylinder arrangements are provided at the tool arm for positioning and operating the demounting tool during the demounting process.

From EP patent 1 714 807, a demounting tool is known which comprises a plate-shaped tool member for engaging into the space between the wheel rim and the tyre bead wherein the tool has a hook at its front end. The tool member is pivotally coupled to a tool carrier arm by an intermediate element to enable a linear as well as a pivotal movement of the tool member during the demounting process.

In EP patent application 2 692 553, a hook-shaped tyre demounting tool for demounting a tyre from a rim is disclosed which is pivotally attached by its one end to a tool carrier arm. Its other or free end provided with a hole, faces towards the tyre to be demounted from the rim. In an insertion position, the free end of the demounting tool is brought into a position, in which it abuts against the wheel rim edge close to the tyre bead, and is inserted between the tyre and the wheel rim. During the further demounting process, the tool is initially guided by the rim and pivots into an extraction position after the whole of the tool has passed the tyre bead. After the demounting process, a returning spring pivots the tool back into the insertion position.

These known demounting tools are of complex design which includes a large number of parts and/or separate drives for actuating them. Moreover, these known devices do not allow both, mounting and demounting of a tyre to or from a wheel rim. Additionally, in particular in the device of EP patent application 2 692 553, the hook-shaped end of the demounting tool has to be brought into an accurate position relative to the wheel rim edge in order to avoid that the tool pivots uncontrolled. In particular, the tool has to be brought in a position very close to the rim so that the side surface of the tool facing to the rim cannot pivot in the direction to the rim. Due to the close position of the tool related to the rim edge, the tool abuts to the rim in case that a moment acts on the tool which pivot the tool in the direction of the rim. Thus, a very precise control is needed for this known demounting tool which leads either to additional time in case that the tool is positioned by an operator, or to increased efforts for the controlling unit in case the tool is positioned by a machine.

Thus, it is an object of the present invention to provide a mounting/demounting tool unit for mounting and demounting a tyre to or from a wheel rim with the same tool which is of a simple construction and which needs less control efforts, and to provide a tyre mounting/demounting machine to which the inventive mounting/demounting tool unit is attached, and in which the control amount is reduced. It is a further object of the present invention to provide an improved mounting/demounting tool for said mounting/demounting tool unit.

This objects are solved by a mounting/demounting tool for mounting a tyre to or demounting a tyre from a rim of a vehicle wheel, comprising a tool body defining a first end of the mounting/demounting tool, an extension extending from the tool body and defining a second end of mounting/demounting tool, and a hook arranged at the extension in the vicinity of the second end, wherein the hook has an inner surface section for gripping and guiding a tyre bead during a tyre demounting operation, and a first outer surface section for guiding a tyre bead during a tyre mounting operation, and wherein a protrusion is provided which extends from between the first outer surface section and a second outer surface section of the hook to the second end.

In a further development of the mounting/demounting tool, the extension may be detachable from the tool body. Alternatively, the tool body and the extension may be made of one piece.

In another further development of the mounting/demounting tool, the protrusion comprises a plastic element or a plastic coating.

In another further development of the mounting/demounting tool, the plastic element or plastic coating is detachable from the extension.

In another further development of the mounting/demounting tool, the extension comprises a lateral bezelled portion in the region of the inner surface section.

In another further development of the mounting/demounting tool, the inner surface section has a tapered shape.

In another further development of the mounting/demounting tool, the first outer surface section has a bezelled shape.

In another further development of the mounting/demounting tool, the extension is curved in its longitudinal direction, and wherein the second outer surface section and the protrusion define a substantially S-shaped, preferably smooth outer contour adjacent the second end.

In another further development of the mounting/demounting tool, the protrusion is substantially bell-shaped.

In another further development of the mounting/demounting tool, the extension and the protrusion have a substantially oval cross section.

According to a further aspect of the invention, a mounting/demounting tool unit is provided comprising the inventive mounting/demounting tool. The mounting/demounting tool unit thus requires less control effort and less actuators than a common mounting/demounting tool unit.

According to a further independent aspect of the invention, a tyre mounting/demounting apparatus comprising the inventive mounting/demounting tool. The inventive mounting/demounting tool may be attached to the tyre mounting/demounting apparatus (wheel servicing apparatus) via the above mentioned mounting/demounting tool unit. Alternatively, the mounting/demounting tool may be attached to a conventional mounting/demounting tool unit having additional actuators for moving the mounting/demounting tool with respect to a tool carrying arm carrying the mounting/demounting tool unit.

Further advantages and embodiments of the present invention will be described in the following together with the drawings listed below. The expression "left", "right", "below" and "above" used in the following description, are referred to the drawings in an alignment such that the reference numbers and the notation of the figures used, can be read in normal.

Figure 1:
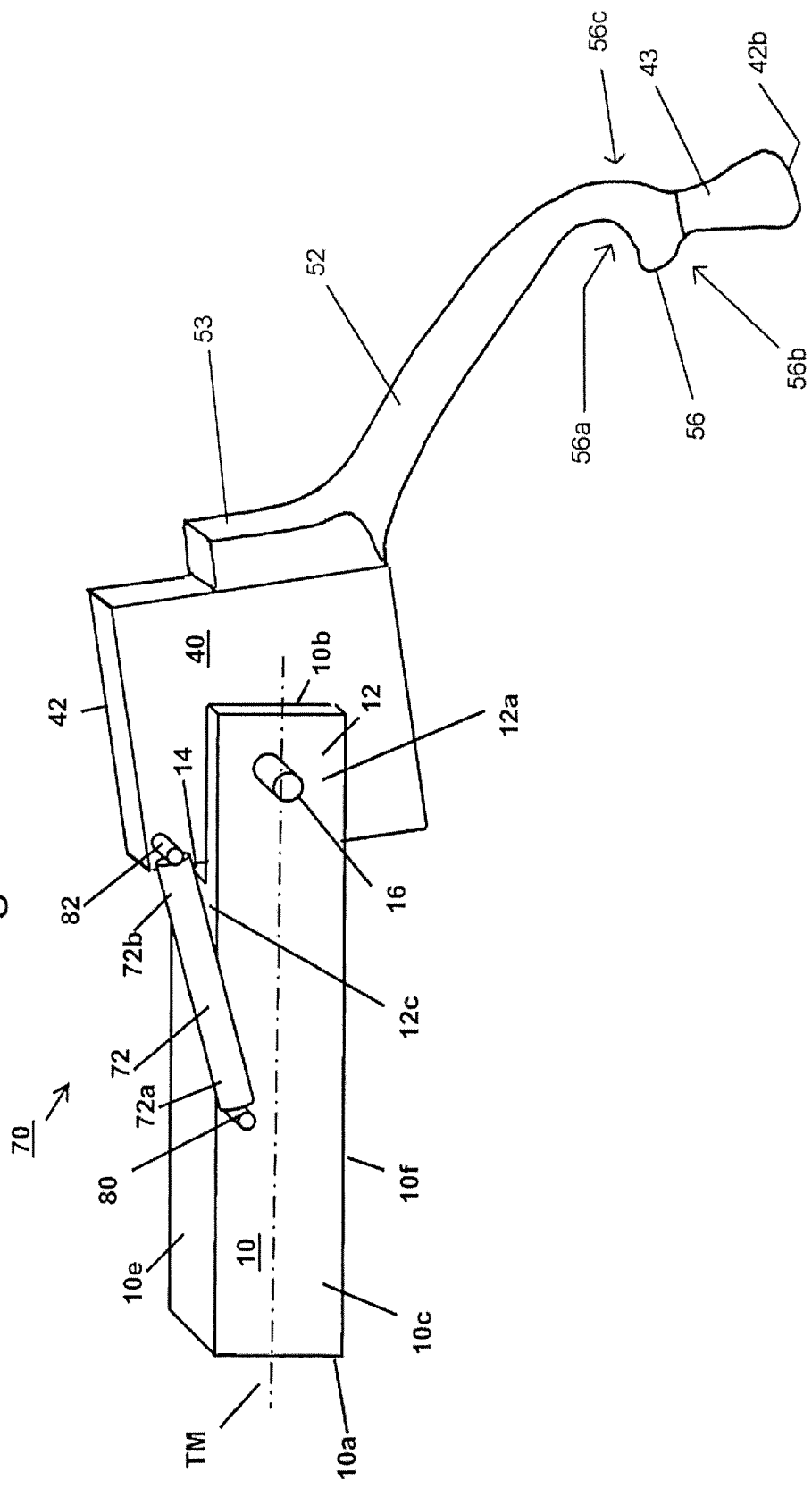
FIG. 1 is a schematic view to a first embodiment of a mounting/demounting unit according to the present invention, shown in the resting/operating position.

An embodiment of the inventive mounting/demounting tool unit U shown in FIG. 1, includes as main components a tool carrier arm 10, a mounting/demounting tool 40 and means 70 for reversibly urging mounting/demounting tool 40 in a resting/operating position and for positioning mounting/demounting tool 40 in said resting/operating position. As it can be seen from FIG. 1, longitudinally extending tool carrier arm 10 is arranged with its center line TM in a horizontal orientation. However, the present invention is not restricted to such an orientation of tool carrier arm 10, but it is also possible that tool carrier arm 10 is provided such that its center line TM is vertically oriented or in an angle between a horizontal and vertical orientation or plane, respectively.

Tool carrier arm 10 according to FIG. 1 is made preferably from steel and has a rectangular- or square-shaped cross-section with a first end 10a and a second end 10b. With its first end 10a, tool carrier arm 10 can be mounted to a drive unit (not shown) for being adapted to be movable back and forth in a direction parallel to the orientation of its center line TM. At second end 10b, tool carrier arm 10 is provided with a fork 12 including a first tine 12a as well as a second tine 12b and a fork base 12c. Tines 12a, 12b are arranged at tool carrier arm 10 such that they extend parallel to each other and define together with fork base 12c a first space 14 being open in the upward and downward direction, referred to FIG. 1. Moreover, a pivot axis 16 is fixed in both tines 12a, 12b such that the center line of pivot axis 16 extends vertically to the center line TM of tool carrier arm 10. As it can be seen from FIG. 1, pivot axis 16 is arranged at least substantially in the longitudinally extending center lines of respective side surfaces 10c, 10d of tool carrier arm 10 and close to second end 10b of tool carrier arm 10.

Mounting/demounting tool 40 includes a tool body 42 defining a first end 42a of the tool and facing in the direction of first end 10a of tool carrier arm 10, and an extension 52 defining a second end 42b facing away from the tool carrying arm 10. Tool body 42 is preferably made from steel and has a substantially rectangular cross-section. Tool body 42 is rotatably attached to the pivot axis 16 of the tool carrying arm 10.

The extension 52 extends between the tool body 42 and the second end 42b, and is provided in the form of a preferably slightly curved finger having a substantially oval or flat, rounded cross section. The extension 52 has a base 53 which is preferably detachably connected to the tool body 42. It is also feasible that the extension 52 and the tool body 42 are made of one piece. Opposite the base 53, near the second end 42b a hook 56 is provided. Adjacent a tip of the hook 56 (in direction to the basis 53) an inner surface section 56a is provided for gripping and guiding a tyre bead during a tyre demounting operation.

Means 70 for reversibly urging mounting/demounting tool 40 in a resting/operating position and for positioning mounting/demounting tool 40 in said resting/operating position, which will further also be referred as tensioning and positioning means 70, are formed by a tension spring in form of a coil spring 72 or a spiral wounded tension spring. Coil spring 72 has a first end 72a and a second end 70b. First end 72a of coil spring 72 is attached to a first holding element 80 extending from tool carrier arm 10 whereas second end 72b is attached to a second holding element 82 extending from tool body 42 of mounting/demounting tool 40. As shown in FIG. 1, tensioning and positioning means 70 urges mounting/demounting tool 40 in the resting/operating position. In the resting/operating position, tensioning element 72 is in its maximum compressed state as well as first and second ends 72a, 72b of coil spring 72 are in closed contact with holding elements 80, 82 such that further rotation of mounting/demounting tool 40 in counter-clockwise direction, as seen in FIG. 1, is prevented. This resting position is simultaneously an operating position such that second end 42b of the tool 40, respectively, can be brought in contact with a tyre bead of a tyre to be demounted from a rim of a vehicle wheel in the area of the rim edge and to urge said tyre bead out of the rim edge of said wheel rim during a demounting operation. Due to the firm contact between the loops of coil spring 72 which is in its maximum compressed state, a push force can be applied to push the tyre bead out of the rim edge. It has to be noted, that coil spring 72 in its maximum compressed state in this configuration, is also in its maximum relaxed state, in order not to apply any additional force to mounting/demounting tool 40, which would cause further rotation of mounting/demounting tool 40.

During the further demounting operation, mounting/demounting tool 40 can carry out a pivoting movement in the clockwise direction and in a counter-clockwise direction. Thereby, extension 52, and in particular hook 56, can pass the tyre bead of tyre T already separated from the rim edge of the wheel rim and the inner surface section 56a can grip the inner side of the tyre bead. Afterwards, mounting/demounting unit U can be moved upwardly, referred to FIG. 1, and can draw the tyre bead griped by hook 56 out of the rim of wheel W. Any forces acting on mounting/demounting tool 40 can be balanced by tension element 72 of tensioning and positioning means 70 so that there is a firm contact between inner surface section 56a and the tyre bead. Moreover, a section of the outer surface of extension 52 and protrusion 43 can come in contact with the rim edge. Any damaging of said rim edge is avoided by the fact that the extension has a substantially flat and rounded cross-section or oval cross-section, respectively, so that it does not exhibit sharp edges and may contact the rim with a relative flat and smooth surface. Furthermore, the protrusion 43 may have a plastic coating to avoid any damages. After the tyre bead has been drawn out of the rim and has been detached from inner surface section 56a, mounting/demounting tool 40 returns back in its resting/operating position shown in FIG. 1.

According to another embodiment of an inventive mounting/demounting tool unit U, which is not shown in the drawing figure the mounting/demounting tool 40 may comprise a tool body 42 having a first end 42a that is part of two projections which extend from tool body. Both projections define also a clevis or fork, respectively, with two prongs wherein the prongs of this clevis are formed by both projections. The projections may be arranged such that they define a second space being open in the leftward and the rightward direction in FIG. 1. The projections may thus define stops restricting the movement of the tool body 42 with respect to the too carrying arm when abutting at the tool carrying arm 10. Other designs of the tool body 42 and its first end 42*a* with respect to the pivotal connection at the tool carrying arm are feasible, too.

Figure 2:
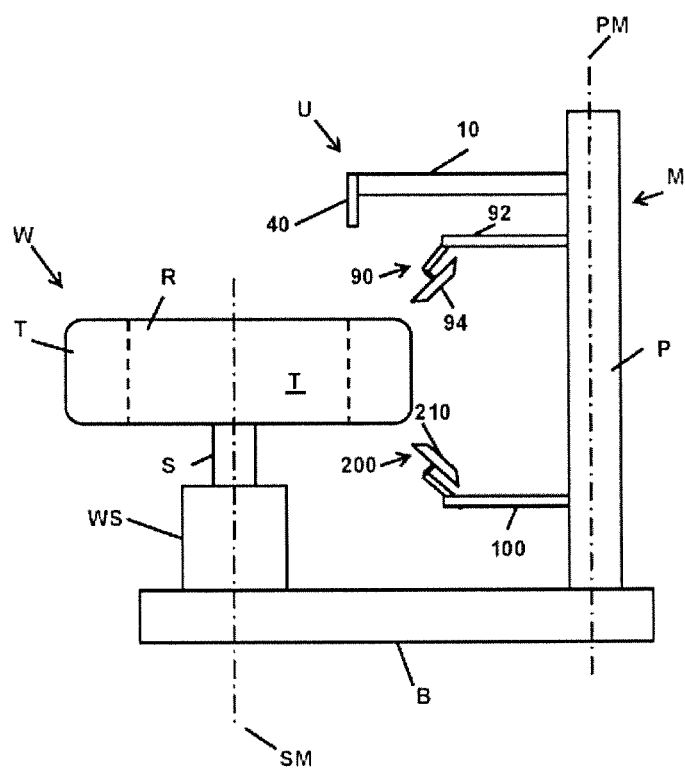
FIG. 2 is a schematic view to an embodiment of a tyre mounting/demounting machine according to the present invention.

In FIG. 2, a tyre mounting/demounting machine M according to the present invention is shown at which the inventive mounting/demounting tool unit U is provided.

Mounting/demounting machine M includes a machine base B and a wheel support WS with a shaft S on which a rim of a wheel W from which a tyre T is to be demounted or to which a tyre T is to be mounted, respectively, can rotatably be clamped. Wheel support WS and shaft S are arranged on machine base B such that center line SM of shaft S and wheel support WS extends vertically. The rim of wheel W clamped on shaft S, can be arranged at the free end of shaft S such that its midplane is horizontally oriented. In the casing of wheel support WS, a drive device, like an electric motor, is arranged for rotating shaft S and the rim of wheel W during the mounting and demounting procedure.

Moreover, on base B, a tool support post P is arranged such that center line PM of tool support post P extends at least substantially parallel to center line SM of wheel support WS and shaft S, respectively. Tool support post P has a horizontal distance to wheel support WS and shaft S such that a complete wheel W, i.e. including a rim R and a tyre T, can reversibly be mounted on shaft S and can freely be rotated by the aforesaid drive device without interference with support post P.

On tool support post P, inventive mounting/demounting tool unit U is arranged such that tool carrier arm 10 extends at least substantially horizontal wherein, at second end 10*a* of tool carrier arm 10, i.e. the free end of the cantilevered arranged tool carrier arm 10, mounting/demounting tool 40 is provided. Tool carrier arm 10 can reversibly be moved along tool support post P by a not shown drive device, like an electric motor or pneumatic or hydraulic cylinder/piston device, respectively. Furthermore, tool carrier arm 10 can be coupled or can include a further drive device, like an electric motor or pneumatic or hydraulic cylinder/piston device, respectively, for at least reversibly moving mounting/demounting tool 40 in the horizontal direction. In principle, it is also possible that at least mounting/demounting tool 40 (but also a part or the whole tool carrier arm 10) can horizontally be moved by hand. Moreover, tool carrier arm 10 can pivotally be arranged at tool support post P such that tool carrier arm 10 can be pivoted in a horizontal plane wherein this pivot movement can be carried out by hand or by a drive device, respectively.

The mounting/demounting machine M may additionally include an upper and a lower bead breaker tool device 90, 200 for releasing the bead of a tyre T from the rim edge of a wheel rim. Both bead breaker tool devices 90, 200, include a bead breaker carrier arm 92, 100 extending at least substantially in the horizontal direction and being mounted to tool support post P in a cantilevered fashion. At the free ends of bead breaker carrier arms 92, 100, a bead breaker tool 94, 210 is rotatably mounted via a bar (not designated) in form of a truncated cone wherein the smaller diameter of the cone faces towards tool support post P as it can be seen in FIG. 2.

Figure 3:
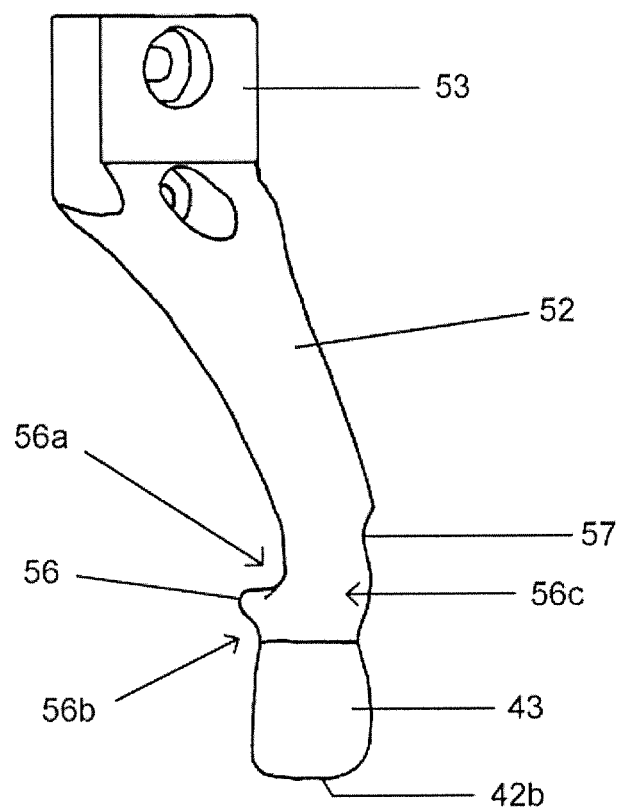
FIG. 3 is an elevated view of the inventive mounting/demounting tool.
Figure 4:
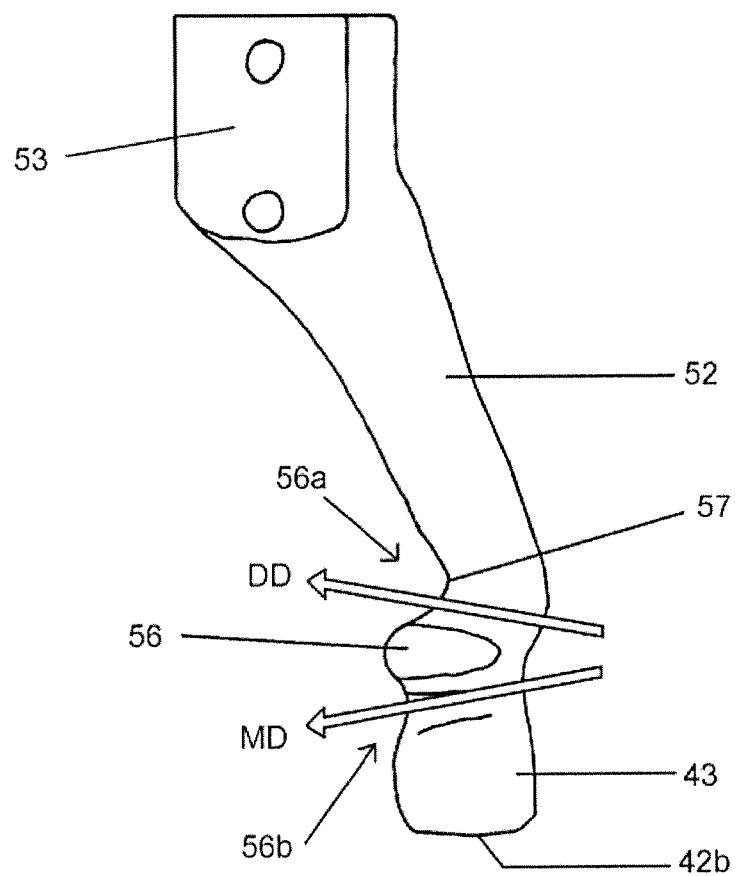
FIG. 4 is another elevated view of the inventive mounting/demounting tool.

With respect to FIGS. 1, 3 and 4, an embodiment of the inventive mounting/demounting tool 40, in particular the design of the extension 52 of the tool 40, is described in more detail. As described above in connection with FIG. 1, the extension 52 extends between the tool body 42 and the second end 42*b* of the mounting/demounting tool 40. The extension 52 has a base 53 connected to the tool body 42. Opposite the base 53, near the second end 42*b* a hook 56 is provided. Adjacent a tip of the hook 56 in direction to the basis 53, the hook has an inner surface section 56*a* for gripping and guiding a tyre bead during a tyre demounting operation. Furthermore, adjacent the tip of the hook 56 in direction to the second end 42*b*, the hook has a first outer surface section 56*b* for guiding a tyre bead during a tyre mounting operation. Adjacent the first outer surface section 56*b*, a protrusion 43 extends from the hook 56 to the second end 42*b* of the tool 40. Moreover, adjacent the protrusion 43, a second outer surface section 56*c* of the hook 56 is provided which is arranged substantially opposite to the inner surface section 56*a*. In other words, the protrusion 43 extends from between the first and second outer surface sections 56*b*, 56*c* of the hook 56, as is shown in FIG. 1.

The protrusion 43 preferably has a bell-shape. This is advantageous for providing a large contact surface for pushing the tyre bead downwards, and simultaneously providing an improved movability of the tool 40 into the space behind the wheel rim (or within the wheel rims). The protrusion 43 and the second outer surface section 56*c* preferably define an outer contour having an S-shape adjacent the second end 42*b* of the tool 40, wherein the S-shape comprises a recess at the interface between the protrusion 43 and the second outer surface section 56*c*. This S-shape and said recess help to further improve the movability of the tool 40 between the tyre and the rim so that introducing the tool 40 into the space between the tyre and the rim, as well as gripping the tyre bead by the hook 56 are facilitated and the risk of damaging the rim or the tyre is minimized.

As shown in FIGS. 1 to 3, the protrusion 43 extends downwardly from the hook 56 (i.e. towards a tyre or wheel to be serviced). The protrusion 43 provides the functionality as disclosed above in conjunction with the second end 42*b*. In other words, the protrusion 43 has a rounded tip (second end 42*b*), and preferably a substantially rounded and flat cross-section or oval cross-section, respectively, even if other cross sections such as circular cross sections are feasible, too. The protrusion can be brought into contact with a tyre bead of a tyre to be demounted from a rim of a vehicle wheel and can push that tyre bead out of the bead seat of said wheel rim during a demounting operation so that the protrusion 43 and the hook 56 can pass the tyre bead. The inner surface section 56*a* forms concave section arranged above the hook 56 (facing substantially towards the base 53) and is designed to grip and extract the tyre bead from the rim during a tyre demounting operation.

Furthermore, the first outer surface section 56*b* of the hook 56, which is arranged between the hook tip and the protrusion 43, forms a concave section arranged below the hook 56 (facing downwards away from the base 53) and is designed to guide and push down the tyre bead during a tyre mounting operation, so that the tyre bead can be pushed into the space between the rim edges by the tool 40.

Said protrusion 43 may be detachably mounted to the extension 52, and may be formed completely from plastic in order to avoid any damages to the wheel rim R. Alternatively, said protrusion 43 may also contain a core-part of metal with a coating of plastic. A preferred embodiment of the extension 52 comprises hook-shaped metal element ending in a core of the protrusion 43 which is covered by a (optionally detachable) plastic element or a plastic coating. Preferably, the plastic element can detached from the core of the protrusion 43 for replacement in case it is worn.

FIG. 3 is a slightly rotated view of the extension of FIG. 1 looking onto the outside of the curvature of the extension 52. As can be seen from FIG. 1 in connection with FIG. 5, the extension 52 preferably, but not necessarily, has in general a flat, rounded or oval cross-section so as to extend wider in circumferential direction than in radial direction of a wheel to be serviced. This improves the contact of the tool to the tyre and also the possible contact to the rim and helps avoiding any damages to the tyre or rim. As is further shown in FIG. 3, in the region of the inner surface section 56a and the second outer surface section 56c, the extension 52 may have a lateral bezelled portion 57 in the form of a bezel or recess arranged at the trailing edge of the extension 52 with respect to a moving direction DD (shown in FIG. 4) of a tyre bead running through the upper hook opening 56a during a tyre demounting operation. This bezelled portion 57 improves tyre bead guidance and contributes to a smooth tyre bead extraction during a tyre demounting operation. This bezelled portion 57 is also shown in FIG. 4.

FIG. 4 is a further rotated view of the extension 52 of FIG. 3. In particular, FIG. 4 is a view looking onto the inside of the curvature of the extension 52 and showing further optional details of the inner surface section 56a and the first outer surface section 56b. Preferably, the inner surface section 56a has a tapered shape so that its contact surface contacting the tyre bead during a tyre demounting operation is oriented substantially inclined with respect to a plane containing the rim edge. The inner surface section 56a is inclined in a direction such that, in moving direction DD of the tyre bead during the demounting operation, the leading edge of the inner surface section 56a is arranged closer to a rim center plane extending parallel to and midway between the rim edges. Thus, when rotating the wheel during the demounting operation, the tyre bead running along the inner surface section 56a is guided axially away from the space between the rim edges. This tapered or inclined shape of the inner surface section 56a significantly improves the guidance of the tyre bead and the contact between the tool and the tyre bead during extraction of the tyre bead and enables a smooth and gentle tyre demounting operation.

Furthermore, the first outer surface section 56b may optionally have a tapered shape so that the contact surface contacting the tyre bead during a tyre mounting operation is oriented substantially inclined with respect to a plane containing the wheel rim edge. The first outer surface section 56b is inclined in a direction such that, in moving direction MD of the tyre bead during the mounting operation, the trailing edge of the first outer surface section 56b is arranged closer to the rim center plane. Thus, when rotating the wheel during the mounting operation, the tyre bead running along the first outer surface section 56b is guided axially into the space between the rim edges. This tapered or inclined shape of the first outer surface section 56b significantly improves the guidance of the tyre bead and the contact between the tool and the tyre bead during insertion of the tyre bead between the rim edges and enables a smooth and gentle tyre mounting operation.

As can be seen in FIG. 4, the direction of rotation of the tyre and the wheel rim during the mounting operation and the demounting operation may be the same. In other words, the moving direction MD of the tyre bead during mounting and the moving direction MD of the tyre bead during demounting are oriented in the same general direction, as shown by the arrows MD and DD in FIG. 4. In this case, the tyre bead is running in the same general direction along the inner surface section 56a or the first outer surface section 56b, so that the respective inclinations of the inner surface section 56a and the first outer surface section 56b are opposite to each other in order to insert or extract, respectively, the tyre bead into or from the space between the rim edges. In other words, as is shown in FIG. 4, the hook tip 56 is confined between the tapered inner surface section 56a and the tapered first outer surface section 56b so that the thickness of the hook 56 is smaller at the leading edge receiving the approaching tyre bead during the mounting or demounting operation, and wider at the trailing edge. On the other hand, it is also feasible to design the respective inclinations of the inner surface section 56a and the first outer surface section 56b in the same direction or substantially parallel to each other. In this case, the thickness of the hook 56 is substantially constant over its width (along the moving direction of the tyre bead). This requires opposite rotating directions of the tyre and wheel during the mounting or demounting operations. In case of omitting the optional tapered shapes of the inner surface section 56a and the first outer surface section 56b so that the hook is symmetrical, rotating directions during mounting or demounting are not predetermined. In a further embodiment (not shown), the tapered shapes of the inner surface section 56a and the first outer surface section 56b and optionally the bezelled shape 57 of the lateral edge may be provided symmetrical on both lateral sides of the extension 52 so that the extension 52 and the hook 56 are substantially symmetrical with respect to the bead moving direction. Thus, the guidance of the tyre bead is still improved, while the rotating direction of the tyre and wheel during the mounting or demounting operation is not predetermined and may be chosen arbitrarily.

REFERENCES

B machine base
M mounting/demounting machine
P support post
PM center line
R rim
RE rim edge
S shaft
SM center line
T tyre
TB tyre bead
TM center line
U inventive mounting/demounting tool unit
W wheel
WS wheel support
1 mounting/demounting tool assembly
10 tool carrier arm
10a, b first end (10a) and a second end (10b) of tool carrier arm
10c, d respective side surfaces
10e upper side of tool carrier arm
12 fork
12a, b first tin (12a) and second tin (12b)
12c fork base
14 first space
16 pivot axis
18 tool support surface
40 a mounting/demounting tool
42 tool body
42a, b first end (42a) second end (42b)
43 protrusion 52 extension
53 basis of the extension 42
54 first auxiliary guiding surfaces
55 second auxiliary guiding surface
56 hook tip
56a inner surface section
56b first outer surface section
56c second outer surface section
57 lateral bezelled portion
70 tensioning and positioning means
72 coil spring, tensioning element
72a, b first end (72a) second end (72b)
80, 82 holding elements
90 upper bead breaker tool device
92 upper bead breaker carrier arm
94 bead breaker tool element
100 lower bead breaker carrier arm
200 lower bead breaker tool device
210 bead breaker tool element

The invention claimed is:

1. A mounting/demounting tool for mounting a tyre to or demounting a tyre from a rim of a vehicle wheel, comprising:
a tool body defining a first end of the mounting/demounting tool;
an extension extending from the tool body and defining a second end of the mounting/demounting tool; and
a hook arranged at the extension in the vicinity of the second end and extending along a first direction, wherein the hook has an inner surface section configured to grip and guide a tyre bead during a tyre demounting operation, a first outer surface section configured to guide a tyre bead during a tyre mounting operation, and opposing the inner surface section in a second direction substantially perpendicular to the first direction, and a second outer surface section opposing the inner surface section in the first direction; and
a protrusion that extends from between the first and second outer surface sections of the hook to the second end, the protrusion forming a depression where it meets the first outer surface section.

2. The mounting/demounting tool according to claim 1, wherein the extension is detachable from the tool body.

3. The mounting/demounting tool according to claim 1, wherein the protrusion comprises a plastic element.

4. The mounting/demounting tool according to claim 3, wherein the plastic element is detachable from the extension.

5. The mounting/demounting tool according to claim 1, wherein the extension comprises a lateral portion in the shape of a bezel or recess in the region of the inner surface section.

6. The mounting/demounting tool according to claim 1, wherein the inner surface section has a tapered shape.

7. The mounting/demounting tool according to claim 1, wherein the first outer surface section has a shape of a bezel or recess.

8. The mounting/demounting tool according to claim 1, wherein the extension is curved in its longitudinal direction, and wherein the second outer surface section and the protrusion define a substantially S-shaped outer contour adjacent the second end.

9. The mounting/demounting tool according to claim 1, wherein the protrusion is substantially bell-shaped.

10. The mounting/demounting tool, according to claim 1, wherein the extension and the protrusion have a substantially oval cross section.

11. A mounting/demounting tool unit configured to be attached to a tool carrying arm of a tyre mounting/demounting apparatus, and comprising the mounting/demounting tool according to claim 1.

12. A tyre mounting/demounting apparatus comprising the mounting/demounting tool according to claim 1.

13. A mounting/demounting tool for mounting a tyre to or demounting a tyre from a rim of a vehicle wheel, comprising:
a tool body;
an extension extending from the tool body in a first direction to an end,
wherein the extension includes:
a first section, from the tool body to a first extension distance, where a width of the extension, in a second direction substantially perpendicular to the first direction, narrows along the first direction down to a first width at the first extension distance,
a second section, from the first extension distance to a second extension distance, where the width of the extension widens along the first direction to a second width at the second extension distance, the second section configured to grip and guide a tyre bead during a tyre demounting operation,
a third section, from the second extension distance to a third extension distance, where the width of the extension narrows along the first direction to a third width at the third extension distance, the third section configured to guide a tyre bead during a tyre mounting operation, and
a fourth section, from the third extension distance to a fourth extension distance, where the width of the extension widens along the first direction to a fourth width at the fourth extension distance.

* * * * *